United States Patent [19]

Neal et al.

[11] 4,442,957

[45] Apr. 17, 1984

[54] FLUID INJECTOR DEVICES

[75] Inventors: Brian P. Neal, Bristol; Alan R. Turner, Bath, both of England

[73] Assignee: Bendix Westinghouse Limited, Bristol, England

[21] Appl. No.: 254,370

[22] Filed: Apr. 15, 1981

[30] Foreign Application Priority Data

May 3, 1980 [GB] United Kingdom ............... 8014911

[51] Int. Cl.³ .......................................... B65D 37/00
[52] U.S. Cl. .................................... 222/207; 222/185; 417/472; 92/35
[58] Field of Search ............... 222/129, 130, 173, 185, 222/206, 207, 209, 212, 213, 214, 215, 57, 52, 361, 386.5; 261/DIG. 35; 417/394, 472; 92/35, 37

[56] References Cited

U.S. PATENT DOCUMENTS 2,663,363 12/1953 Krautter et al. ............... 417/472 X Primary Examiner—Joseph J. Rolla
Assistant Examiner—Michael S. Huppert
Attorney, Agent, or Firm—Ken C. Decker; William N. Antonis

[57] ABSTRACT

An antifreeze injector device for compressed air braking systems has a closed compressible bellows or compensatable rubber cylinder, the inside of which communicates with liquid to be injected and the exterior of which is subject to actuation pressure. The effective area subject to the actuator pressure being greater than that subject to the liquid to enable operator to inject into a reservoir of elevated pressure but to avoid the use of sliding pistons.

9 Claims, 2 Drawing Figures

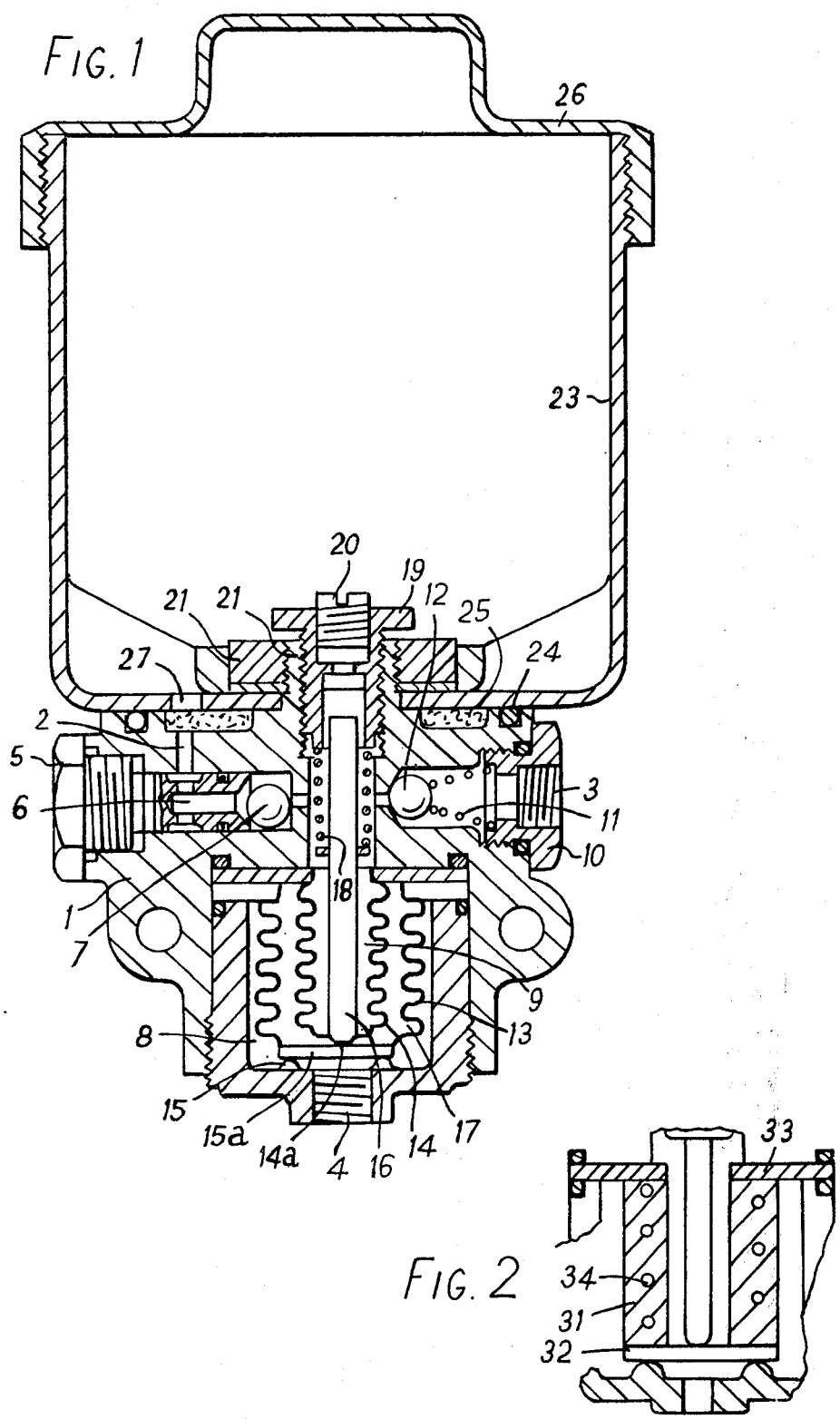

FLUID INJECTOR DEVICES

This relates to fluid injection devices and relates especially but not exclusively to injector devices for injecting anti-freeze liquid into a compressed air system.

Injector devices have already been proposed for injecting anti-freeze fluid such as alcohol into air braking systems. Typically, such injection is arranged to take place in response to an air pressure signal acting upon a piston which operates a plunger to force anti-freeze liquid from a chamber, in the case of a compressed air braking system, into the compressor supply line to the braking system reservoir or reservoirs. This may be arranged to occur at the same time as the switching of a compressor unloader either to the on-load or off-load condition and thereby maintain a desired amount of anti-freeze fluid in the system.

Typical such injectors have been described, for example, in German ALS. No. 1,179,469, German OLS No. 2,220,974, or U.K. Patent Specification No. 1,429,489, but all these devices are susceptible to problems if they are left unattended such as may occur in summer months when freezing is unlikely to be of any concern. At that time a vehicle operator may neither replenish the anti-freeze agent nor render the device inoperable in response to input pressure signals. The result of such lack of attention can be that after the last remaining anti-freeze agent has been discharged into the compressed air brake system, the device continues to be actuated dry. Since the device relies for its operation on sliding piston seals, typically of neoprene or other such suitable material, they can develop increased hysteresis and eventually fail to operate. The seals may either then seize-up or leak and, in either event, the injector device is rendered unserviceable by the time it is refilled for service in subsequent cold weather conditions.

The present invention provides a fluid injector device including a housing having an input port; a one-way output port and a control signal port, a chamber having a dividing wall to provide a first region connecting with the input port and a second region connecting with the control signal port, said dividing wall comprising a compressible member the effective area of which presented to fluid pressure in the first region is greater than the effective area presented to fluid pressure in the second region and which in operation is compressible by a signal pressure at the control signal port to eject fluid from the first region via the output port and being returnable to permit replenishment of fluid into the first region via the inlet port.

The dividing wall may comprise sealed pairs of bellows.

The dividing wall may alternatively comprise a hollow cylinder of rubber or other material which is similarly resiliently deformable under pressure.

An adjustable stop which is adjustable to determine the volume of fluid injected at each operation of the device may preferably be included.

In order that the invention may be more clearly understood and readily carried into effect, the same will be further described by way of example with reference to the accompanying drawing of which:

FIG. 1 illustrates the relevant parts of a fluid injector in accordance with one embodiment of the invention, and FIG. 2 illustrates an alternative form of compressible dividing wall.

Referring to FIG. 1, the injector includes a body denoted by reference 1, provided with an input port 2, an output port 3 and a control port 4. The input port 2 is provided by a screw-in plug 5 with an annular recess providing access through a central passage 6 and a ball valve 7, (which naturally tends to rest clear of its seat as shown), to a first region 9. Similarly, the output port 3 is provided via a screw-in plug 10 which retains a light spring 11 and a ball valve member 12 so that the output port is a one-way port providing for the flow of fluid only in the direction from first region 9 via the port 3. The region 9 is separated from a further intermediate region 17 by a longitudinally compressible generally cylindrical member formed by an outer bellows 13 within which a further bellows 14 is positioned. The region 17 is vented via a passage (now shown) into the tank 23 to be referred to below. The effect of the two bellows is that the effective area presented to a second region 8 acting outside 1st region 9 is greater than the effective area presented to pressure acting inside. The closed end 14a of the bellows 14 engages with the closed end 13a of the bellows 13 which itself rests on stops 15 in the base of the housing. The control port 4 communicates with a region 8 outside bellows 13. Extending axially into the bellows, a slideable pin 16 is urged into engagement with the lower end of the inner bellows by virtue of a captive spring 18, the thrust of which is adjustable by a screw-adjustable member 19 and within 19 there is provided a further adjustable stop member 20 which, when screwed inwards, reduces the possible upward stroke of the lower end of the two bellows under the influence of control pressure at the port 4. The housing has an upwardly extending spigot 21 which is threaded to receive a clamping nut 22 within the tank 23 for containing anti-freeze liquid. The base of the tank is bedded onto an O-ring 24 and a suitable liquid filter 25 is provided between outlet passages 27 of the tank and the input port 2. The tank 23 is provided with a suitable cover 26 which is removable by unscrewing to enable replenishment of the anti-freeze liquid and also to gain access to the adjustment provided by members 19 and 20.

In operation of the device of FIG. 1, it is assumed that the tank 23 is at least partly filled with anti-freeze liquid, that the port 3 is connected to a reservoir charging line of a compressed air braking system. The port 4 is connected moreover to a source of signal pressure which is itself derived from the reservoir which operates upon the compressor going on-load or going off-load in accordance with the operation of a governor or unloader which governs the maintenance of reservoir pressure for a system. Upon application of a pressure signal to the port 4, the pair of bellows 13, 14 are upwardly deflected carrying with them the slideable pin 16, the upward stroke being limited by the amount of travel for 16 before engagement with the adjustable member 20. This reduces the volume of the region 9 and since valve member 7 rests away from its seat any air remaining in region 9 tends to bubble back into the tank via passage 2. Upon the downward stroke following removal of the control pressure at port 4, the one-way valve 7 permits replenishment of the region 9 from the tank 23 via the filter 25, input port 2 and bore 6. After a few such operations the air will have been purged from 9 up to the level of the output valve 12 and input valve 7. On the next and subsequent operations sufficient viscous thrust of liquid in volume 9 acts against valve member 7 and it therefore seats against the inner end of passage 6 so that a pressure can be guaranteed in volume 9 sufficient to overcome the reservoir pressure acting on valve member 12. Liquid is therefore injected via the valve 12 to the output port, the volume of liquid displaced depending upon the setting of member 20 which is accessible by removing the cover 26. The setting of member 19 may be changed if it is desired to alter the pressure at which the device operates. Referring to FIG. 2, an alternative to the pair of bellows 13 and 14 of FIG. 1 is to provide a compressible alcohol resistent rubber cylinder 31 with moulded-on end cap 32 an upper washer 33 and a helical stiffening insert 34 for reducing or preventing radial deformation of the cylinder under the effects of control pressure at port 4. The device with the moulded rubber cylinder operates the same way as the device of FIG. 1.

If required, the tank 23 may be dispensed with and a piped supply may be connected via a modified form of the screw-in plug 5. In such a case, it may be desirable to provide a suitable screw-on cover for the adjustment 19 and the adjustment 20. Such screw-on cap would readily be adapted to fit the spigot 21.

We claim:

1. A fluid injector device including a housing having an input port, a one-way output port and a control signal port, a chamber having a dividing wall to provide a first region connecting with the input port and a second region connecting with the control signal port, said dividing wall comprising a compressible member the effective area of which presented to fluid pressure in the second region is greater than the effective area presented to fluid pressure in the first region and which in operation is compressible by a rising signal pressure at the control signal port to eject fluid from the first region via the output port and being returnable to permit replenishment of fluid into the first region via the inlet port.

2. A fluid injector device as claimed in claim 1 wherein said compressible member comprises a bellows closed at one end.

3. A fluid injector device as claimed in claim 2 including an inner and outer bellows arranged such that the interior of the inner bellows is part of the first region and the exterior of the outer bellows communicates with the second region, a space between said bellows being isolated from both regions.

4. A fluid injector device as claimed in claim 1, said compressible member comprising an antifreeze resistant longitudinally deformable cylinder.

5. A fluid injector device as claimed in claim 1, 2, 3, or 4, the input port including means which will permit flow of air through the output port when a step increase of control port pressure is applied to the compressible member but which presents appreciable resistance to outward flow of liquid.

6. A fluid injector device as claimed in claim 5 wherein said means comprises a valve which tends to reverse open for the outward flow of air but which closes for outward flow of liquid.

7. A fluid injector device as claimed in claim 1 including an adjustable stop operable to limit the compression of the compressible member in response to control signal pressures.

8. A fluid injector device as claimed in claim 1 including an adjustable spring biass mean operable to determine the operating control signal pressure to which the device responds.

9. A fluid injector device having a housing defining a chamber therewithin, said housing having an input port, a one-way output port, and a control signal port communicating with the chamber, said control signal port being connected to a positive source of signal pressure, said positive source of signal pressure being located outside of said housing, dividing wall means dividing said chamber into a first region communicating with the input and output ports and a second region communicating with the control signal port, said dividing wall means having a first fluid pressure responsive surface exposed to the fluid pressure level in said first region and a second fluid pressure responsive surface exposed to the fluid pressure level in said second region, the effective area of said second surface being greater than the effective area of said first surface whereby said dividing wall means responds to the force differential created by said signal pressure to move from a rest position to eject fluid from the first region via the output port, and resilient means yieldably urging said dividing wall means toward said rest position.

* * * * *